US009501454B2

(12) United States Patent
Budavari

(10) Patent No.: US 9,501,454 B2
(45) Date of Patent: Nov. 22, 2016

(54) DOCUMENT MANAGER AND BROWSER

(71) Applicant: OPEN TEXT S.A., Luxembourg (LU)

(72) Inventor: Peter Budavari, Munich (DE)

(73) Assignee: Open Text SA ULC, Halifax (CA)

( * ) Notice: Subject to any disclaimer, the term of this patent is extended or adjusted under 35 U.S.C. 154(b) by 784 days.

(21) Appl. No.: 13/780,366

(22) Filed: Feb. 28, 2013

(65) Prior Publication Data

US 2013/0305150 A1 Nov. 14, 2013

Related U.S. Application Data

(60) Provisional application No. 61/646,113, filed on May 11, 2012.

(51) Int. Cl.
| | |
|---|---|
| *G06F 3/00* | (2006.01) |
| *G06F 17/21* | (2006.01) |
| *G06F 3/0488* | (2013.01) |
| *G06F 3/0481* | (2013.01) |
| *G06F 3/0482* | (2013.01) |
| *G06F 3/0483* | (2013.01) |

(52) U.S. Cl.
CPC ......... *G06F 17/211* (2013.01); *G06F 3/0482* (2013.01); *G06F 3/0483* (2013.01); *G06F 3/0488* (2013.01); *G06F 3/04815* (2013.01); *G06F 2203/04806* (2013.01)

(58) Field of Classification Search
CPC . G06T 15/00; G06T 19/00; G06F 17/30572; G06F 17/30716; G06F 15/0225; G06F 17/30905; G06F 17/211; G06F 3/0448; G06F 3/04815; G06F 3/0482; G06F 2203/04806; G06K 9/00463
See application file for complete search history.

(56) References Cited

U.S. PATENT DOCUMENTS

| | | | | | |
|---|---|---|---|---|---|
| 5,764,227 | A | * | 6/1998 | Ishimine | G06F 3/0483 715/207 |
| 2010/0313164 | A1 | * | 12/2010 | Louch | G06F 3/0481 715/790 |
| 2012/0260293 | A1 | * | 10/2012 | Young | H04N 21/4314 725/52 |

* cited by examiner

*Primary Examiner* — Kyle Stork
(74) *Attorney, Agent, or Firm* — Sprinkle IP Law Group

(57) ABSTRACT

In response to a user touching one of a plurality of pieces of content arranged on a display in a two-dimensional manner, a browsing system and method may transform the pieces of content into a three-dimensional arrangement, with the desired piece of content being displayed on the very top and overlapping adjacent pieces of content. The plurality of pieces of content can be images, each of which may be associated with a document. The images may be sorted based on the associated documents, for instance, the relevance of the associated documents with respect to a context or topic. The images in the three-dimensional arrangement may have a size which decreases from the desired image in both horizontal and vertical directions such that only a portion of the images being overlapped is exposed.

28 Claims, 15 Drawing Sheets

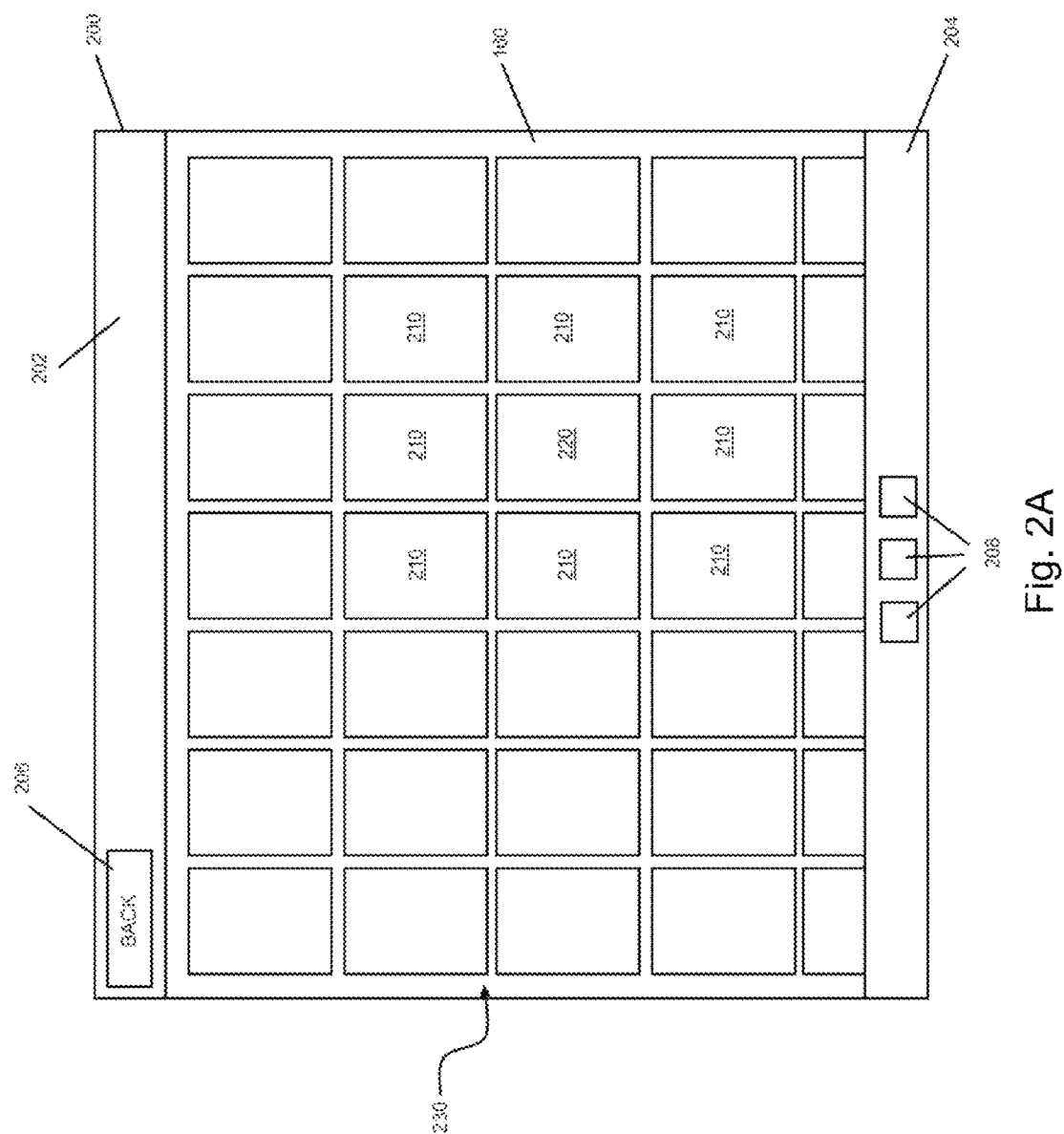

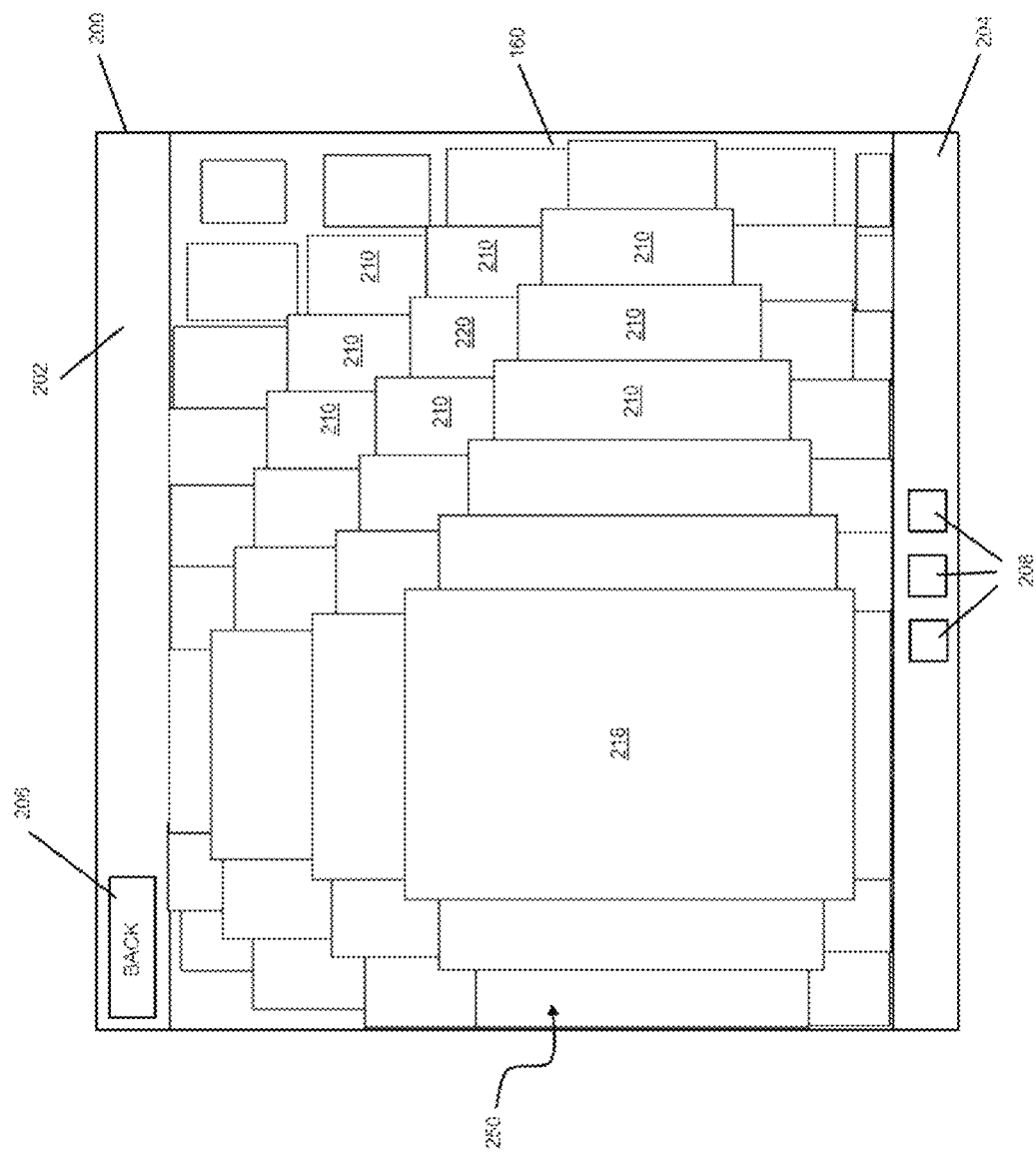

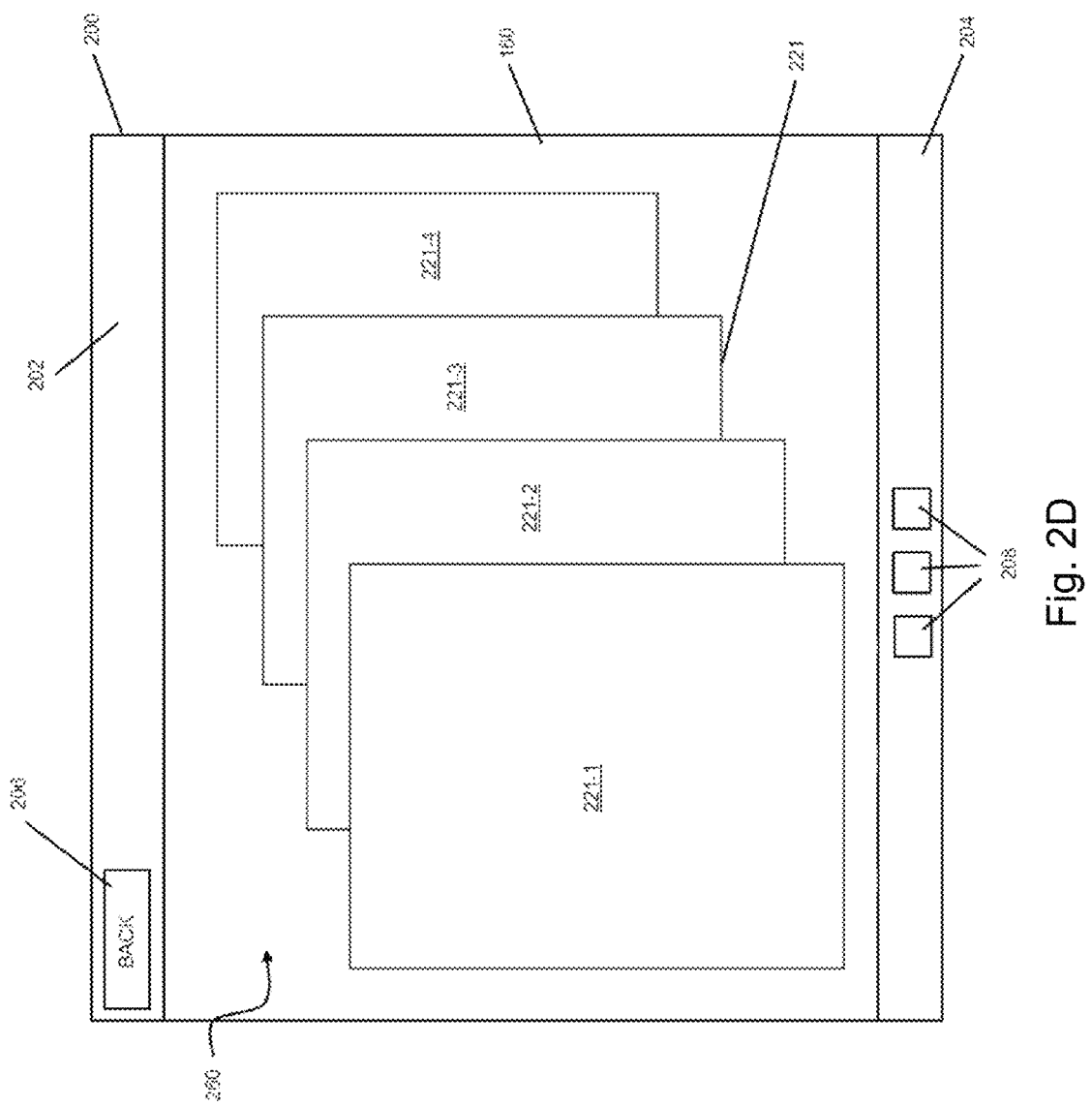

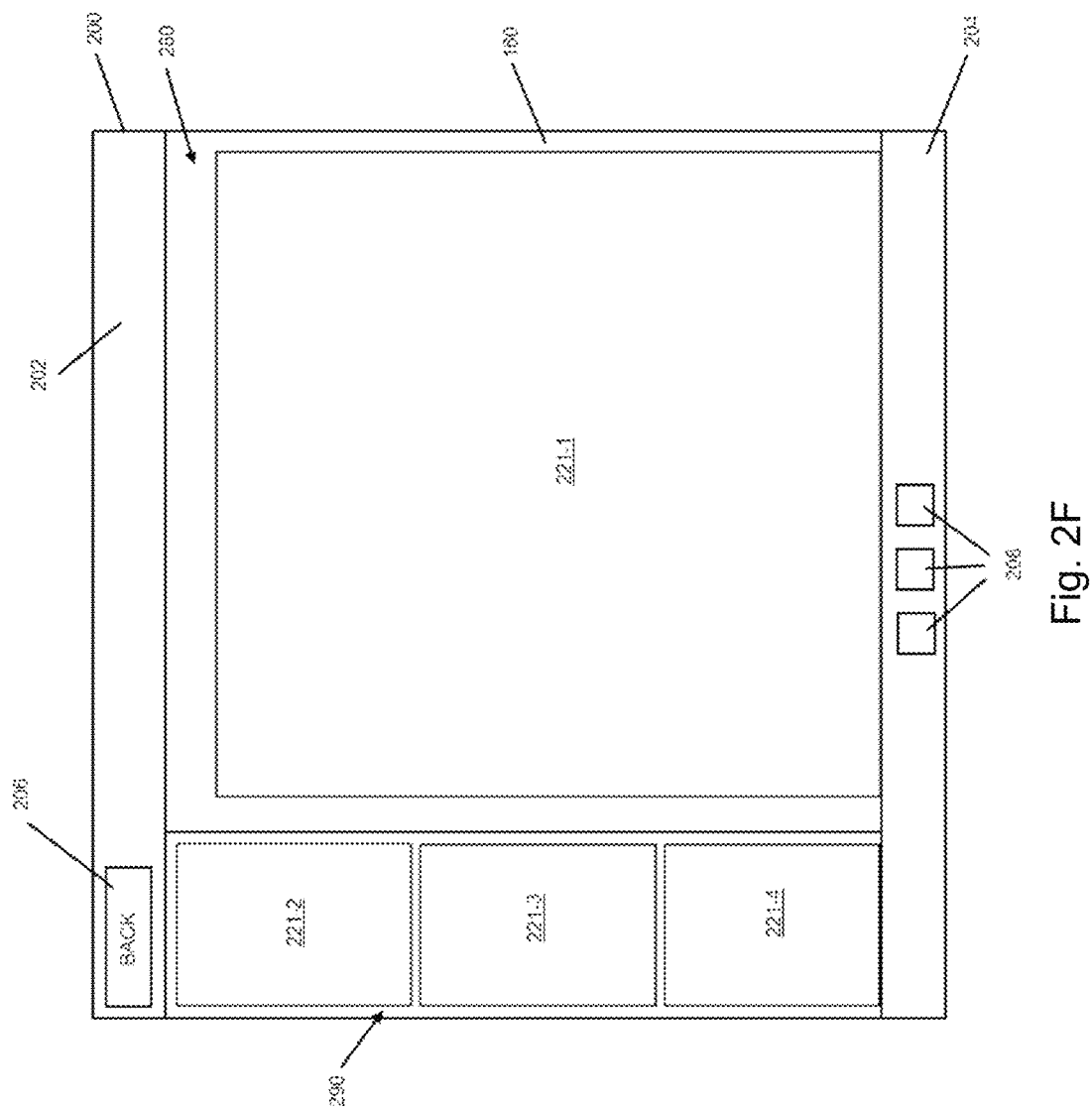

DOCUMENT MANAGER AND BROWSER

CROSS-REFERENCE TO RELATED APPLICATION(S)

This is a conversion of and claims a benefit of priority under 35 U.S.C. §119(e) from U.S. Provisional Application No. 61/646,113, filed May 11, 2012, entitled "DOCUMENT MANAGER AND BROWSER," which is fully incorporated by reference herein.

TECHNICAL FIELD

This disclosure relates generally to document management. More particularly, the disclosure relates to browsing through documents in a document library.

DESCRIPTION OF THE RELATED ART

Personal computers typically include document management and document browsing programs for managing various kinds of documents such as text documents, images, music and video. The document management and document browsing programs typically utilize a graphical user interface that allows a user to store, list, sort, modify, display and output their documents. The graphical user interface typically includes an icon based browse window that allows the user to browse through and select a particular document based on icons associated with each kind of documents. Examples of such document management and browsing programs are Explorer of Microsoft™ Windows™ operating systems and Finder of Apple's Mac OS X.

The abovementioned document management and browsing programs are usually difficult to be searched through and/or browse in order to find a particular document or particular content, especially when configured so as to display the documents in a tree structure or as icons.

SUMMARY OF THE DISCLOSURE

While an icon based browse window is sufficient, there is still a desire for improved methods and systems for managing and browsing through documents. For example, an icon based browse window may be limiting to user's who desire to browse through documents in a document library consisting of tens, hundreds or thousands of documents. Furthermore, in some cases, finding a desired document can be difficult when browsing through tens, hundreds or thousands of documents. Therefore, improved methods and systems for managing and browsing through documents are desired.

As a method for browsing documents with respect to a display screen associated with a computing device, one embodiment can, for example, include at least: providing a browsing region on the display screen; displaying, within the browsing region, a plurality of images on the display screen in a two-dimensional arrangement, where in the two-dimensional arrangement the images are arranged in a horizontal direction and a vertical direction, each of the images pertaining to an associated document and providing a preview of the associated document; receiving a first user input identifying within the browsing region a first particular image from the images displayed in the two-dimensional arrangement; displaying, in response to the first user input, the plurality of images on the display screen in a three-dimensional arrangement, where in the three-dimensional arrangement the images are arranged in the horizontal direction and the vertical direction, the images are displayed having a size which decreases from the first particular image being largest in both the horizontal direction and the vertical direction and where images being displayed larger overlap adjacent images being displayed smaller in both the horizontal direction and the vertical direction such that only a portion of the images being overlapped is exposed.

As the method, one embodiment can, for example, include at least that in the two-dimensional arrangement the images are displayed having a predetermined size and/or that in the three-dimensional arrangement the first particular image is displayed having a size allowing the user to read the preview of the associated document.

As the method, one embodiment can, for example, include at least that in the two-dimensional arrangement the images are arranged so as to not overlap each other.

As the method, one embodiment can, for example, further include at least that in the three-dimensional arrangement the size of the images decreases up to the predetermined size and/or that in the three-dimensional arrangement the portion of the images being exposed, i.e. not being overlapped, increases from the first particular image in both the horizontal and the vertical direction.

As the method, one embodiment can, for example, include that at least in the three-dimensional arrangement the images are arranged in the horizontal direction according to a horizontal sorting order and/or in the vertical direction according to a vertical sorting order, the horizontal sorting order preferably differs from the vertical sorting order.

As the method, one embodiment can, for example, further include at least: receiving a second user input identifying a second particular image from the other of the images displayed in the three-dimensional arrangement; and displaying, in response to the second user input, the plurality of images on the display screen in the three-dimensional arrangement, where the second particular image is displayed largest.

As the method, one embodiment can, for example, include at least receiving a third user input identifying the first particular image in the three-dimensional arrangement; and displaying, in response to the third user input, the document associated with the first particular image.

As the method, one embodiment can, for example, further include at least that if the document comprises more than one page the pages of the document are displayed having the same size in a diagonal arrangement and/or that in the diagonal arrangement the first page of the document is displayed so as to overlap an adjacent page of the document such that only a portion of the adjacent page is exposed.

As the method, one embodiment can, for example, include at least: receiving a fourth user input identifying the adjacent page of the document in the diagonal arrangement; and displaying, in response to the fourth user input, the adjacent page of the document in the diagonal arrangement so as to overlap the first page of the document such that only a portion of the first page is exposed.

As the method, one embodiment can, for example, include at least: receiving a fifth user input identifying the first page of the document in the diagonal arrangement; providing, in response to the fifth user input, a page region and a selection region within the browsing region; and displaying the first page in the page region and the adjacent page in the selection region, where the first page in the page region is displayed larger in size than the adjacent page in the selection region.

As an electronic device, one embodiment can, for example, include at least: a storage device for storing a plurality of documents; a user input device configured to receive one or more user inputs from a user of the electronic device; a display operable to provide a browsing region, to present, within the browsing region, a plurality of images in a two-dimensional arrangement, where in the two-dimensional arrangement the images are arranged in a horizontal direction and a vertical direction, each of the images pertaining to an associated document and providing a preview of the associated document; and a controller configured to receive a first user input within the browsing region, via the user input device, identifying a first particular image from the images displayed in the two-dimensional arrangement, and to control, in response to the first user input, the display to present the plurality of images in a three-dimensional arrangement, where in the three-dimensional arrangement the images are arranged in the horizontal direction and the vertical direction, the images are displayed having a size which decreases from the first particular image being largest in both the horizontal direction and the vertical direction and where images being displayed larger overlap adjacent images being displayed smaller in both the horizontal direction and the vertical direction such that only a portion of the images being overlapped is exposed.

As the electronic device, other embodiments can, for example, include at least that in the two-dimensional arrangement the images are arranged so as to not overlap each other and/or that in the two-dimensional arrangement the images are displayed having a predetermined size and/or that in the three-dimensional arrangement the first particular image is displayed having a size allowing the user to read the preview of the associated document and/or that in the three-dimensional arrangement the size of the images decreases up to the predetermined size and/or that in the three-dimensional arrangement the portion of the images being exposed, i.e. not being overlapped, increases from the first particular image in both the horizontal and the vertical direction and/or that at least in the three-dimensional arrangement the images are arranged in the horizontal direction according to a horizontal sorting order and/or in the vertical direction according to a vertical sorting order, the horizontal sorting order preferably differs from the vertical sorting order.

As the electronic device, other embodiments can, for example, include at least that the controller is configured to receive a second user input, via the user input device, identifying a second particular image from the other of the images displayed in the three-dimensional arrangement, and to control, in response to the second user input, the display to present the plurality of images on the display screen in the three-dimensional arrangement, where the second particular image is displayed largest, and/or that the controller is configured to receive a third user input, via the user input device, identifying the first particular image in the three-dimensional arrangement, and to control, in response to the third user input, the display to present the document associated with the first particular image, and/or that if the document comprises more than one page the pages of the document are displayed having the same size in a diagonal arrangement, and/or that in the diagonal arrangement the first page of the document is displayed so as to overlap an adjacent page of the document such that only a portion of the adjacent page is exposed, and/or that the controller is configured to receive a fourth user input, via the user input device, identifying the adjacent page of the document in the diagonal arrangement, and to control, in response to the fourth user input, the display to present the adjacent page of the document in the diagonal arrangement so as to overlap the first page of the document such that only a portion of the first page is exposed, and/or that the controller is configured to receive a fifth user input, via the user input device, identifying the first page of the document in the diagonal arrangement, and to control, in response to the fifth user input, the display to provide, in response to the fifth user input, a page region and a selection region within the browsing region, and to present the first page in the page region and the adjacent page in the selection region, where the first page in the page region is displayed larger in size than the adjacent page in the selection region.

According to an embodiment, the display screen can, for example, be a touch screen.

As a computer readable storage medium having stored therein instructions, which when executed by a computing device with a display screen, one embodiment can, for example, include instructions which cause the computing device at least to: provide a browsing region on the display screen; display, within the browsing region, a plurality of images on the display screen in a two-dimensional arrangement, where in the two-dimensional arrangement the images are arranged in a horizontal direction and a vertical direction, each of the images pertaining to an associated document and providing a preview of the associated document; receive a first user input identifying within the browsing region a first particular image from the images displayed in the two-dimensional arrangement; and display, in response to the first user input, the plurality of images on the display screen in a three-dimensional arrangement, where in the three-dimensional arrangement the images are arranged in the horizontal direction and the vertical direction, the images are displayed having a size which decreases from the first particular image being largest in both the horizontal direction and the vertical direction and where images being displayed larger overlap adjacent images being displayed smaller in both the horizontal direction and the vertical direction such that only a portion of the images being overlapped is exposed.

BRIEF DESCRIPTION OF THE DRAWINGS

The invention may best be understood by reference to the following description taken in conjunction with the accompanying drawings in which:

FIGS. 2A to 2F depict diagrammatic representations of an icon based browse window for browsing through documents, in accordance with one embodiments of the invention.

DETAILED DESCRIPTION

Reference will now be made in detail to embodiments, examples of which are illustrated in the accompanying drawings. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

The invention generally pertains to methods and systems that improve the way documents are stored, listed, sorted, modified, displayed, output, browsed, and managed.

In some embodiments, the electronic device is a computing device such a personal computer, laptop, PDA, tablet computer, and/or mobile telephone.

Figure 1:
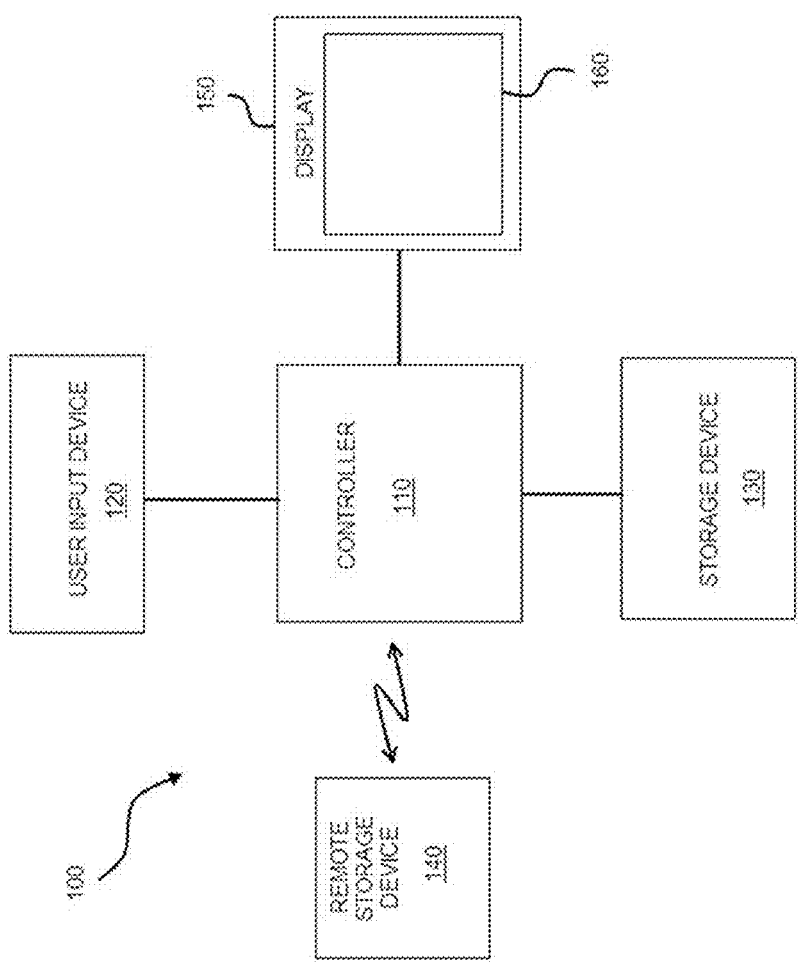
FIG. 1 is a block diagram representing an electronic device for storing, managing, selecting, displaying and outputting documents, in accordance with one embodiment of the invention.

FIG. 1 is a simplified block diagram of an electronic device 100 capable of storing, managing, selecting, displaying and outputting documents, in accordance with one embodiment of the invention.

The electronic device 100 may include a controller 110 (which may include one or more processing units), a storage device 130 (which may include one or more computer readable storage mediums), a display 150 (which according to a preferred embodiment is a touch-sensitive display or touch screen), and a user input device 120. These components may communicate over one or more communication buses or signal lines.

It should be appreciated that the electronic device 100 is only one example of such an electronic device, and that the electronic device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

The storage device 130 may be configured to store a plurality of documents such as documents containing text, images, graphical elements, videos, sounds and the like. Examples of documents include Microsoft Word, Excel, PowerPoint, Adobe Portable Document Format (PDF), Hyper Text Markup Language, eXtensible Markup Language (XML), Open Document Format (ODF), and the like.

The storage device 130 may also be configured to store a plurality of images, each of the images pertaining to an associated document, and/or a plurality of previews, each of the previous pertaining to an associated document and being for example a thumbnail thereof. The storage device 130 may include local storage devices being incorporated in the electronic device 100 such as hard drives, solid state disks, and the like, locally connected storage device such as Universal Serial Bus (USB) memory devices, hard drives, and the like, and/or remote storage device 140 such as server storage devices, cloud storage devices, and the like.

The display 150 may be configured to provide visual output to the user. The display 150 may include a touch screen having a touch-sensitive surface that accepts input from the user based on haptic and/or tactile contact. In an exemplary embodiment, a point of contact between the touch screen and the user corresponds to a finger of the user. The display 150 may use liquid crystal display (LCD) technology, or light emitting polymer display (LPD) technology, although other display technologies may be used in other embodiments. If the display 150 is the touch screen, contact and any movement or breaking thereof may be detected using any of a plurality of touch sensing technologies now known or later developed, including but not limited to capacitive, resistive, infrared, and surface acoustic wave technologies, as well as other proximity sensor arrays or other elements for determining one or more points of contact with the touch screen.

The display 150 may also be configured to output a browsing region 160 in which a plurality of images may be displayed. The display 150 may additionally be configured to display the plurality of images in a two-dimensional arrangement, i.e. an arrangement in which the images are arranged in a horizontal direction and a vertical direction. In one exemplary embodiment, the display 150 may display the images in a size which may be predetermined and/or configurable by the user, or automatically selected, and/or so as to not overlap each other.

According to one exemplary embodiment, the display 150 may be configured to display the images in the two-dimensional arrangement in a sorted manner. In one example, the images may be arranged in the two-dimensional arrangement in the horizontal direction according to a horizontal sorting order and/or in the vertical direction according to a vertical sorting order. Preferably, the horizontal sorting order and the vertical sorting order differ from each other. The horizontal sorting order and/or the vertical sorting order may be predetermined and/or configurable by the user. The horizontal sorting order and/or the vertical sorting order may be based, for example, on a time of creation and/or last change and/or last view criterion (i.e., chronologically) of the associated documents to which the images pertain, a collation (i.e., alphabetically or numerically) of the associated documents, and a content relation criterion (i.e., degree of relation to context/topic or degree of inter-relation between content) of the associated documents.

In another exemplary embodiment, the display 150 may be configured to display the plurality of images in a three-dimensional arrangement. In the three-dimensional arrangement the images are arranged in the horizontal direction and the vertical direction similar to the arrangement of the images in the two-dimensional arrangement. The images may further be displayed having a size which decreases from a particular image being largest in both the horizontal direction and the vertical direction and/or the images being displayed larger are displayed so as to overlap adjacent images being displayed smaller in both the horizontal direction and the vertical direction such that only a portion of the images being overlapped is exposed.

According to one exemplary embodiment, the display 150 may also be configured to display the images in the three-dimensional arrangement in the sorted manner, where the sorting orders in the horizontal direction and the vertical direction may correspond to the sorting orders in the horizontal direction and/or the vertical direction of the two-dimensional arrangement. However, it should be appreciated that the display 150 may be configured to change the horizontal sorting order and/or the vertical sorting order when displaying the images in the two-dimensional arrangement and the three-dimensional arrangement.

According to one exemplary embodiment, the display 150 may also be configured to display the document associated with the particular image. Specifically, in this exemplary embodiment, the display 16 may be configured to display if the document comprises more than one page the pages of the document so as to have the same size in a diagonal arrangement. In the diagonal arrangement the first page of the document may be displayed so as to overlap an adjacent page of the document such that only a portion of the adjacent page is exposed.

The display 150 for example may additionally be configured to provide a page region and a selection region within the browsing region 160, and to display the first page in the page region and the adjacent page in the selection region, where preferably the first page in the page region is displayed larger in size than the adjacent page in the selection region.

The user input device 120 may be configured to receive one or more user inputs from a user of the electronic device. The user input device 120 may for example include mice, touch pads, navigation pads, buttons, touch screens, and the like. In some embodiments, the user input device 120 is a touch-sensitive area of the electronic device 100 that, unlike the touch screen, does not provide visual output, or a touch-sensitive surface that is separate from a touch screen as the display 150 or an extension of the touch-sensitive surface formed by the touch screen.

The controller 110 which for example may include one or more processing units may be configured to communicate and/or interact with the storage device 130 and/or the remote storage device 140 to obtain images, documents, and the like. The controller 110 may also be configured to control the display 16 and/or to receive user input from the user input device 120. It should be appreciated that the controller 110 may additionally be configured to interact with other device connected thereto, such as a speaker, microphone, and the like.

According to one exemplary embodiment, the controller 110 may be configured to control the display 150 to provide a browsing region 160 and to display, within the browsing region 160, a plurality of images in a two-dimensional arrangement. The images may be obtained by the controller 110 from the storage device 130 and/or the remote storage device 140. The controller 110 may further be configured to receive a user input within the browsing region 160, via the user input device 120, identifying an image from the images displayed in the two-dimensional arrangement by the display 150, and to control, in response to the user input, the display 150 to present the plurality of images in a three-dimensional arrangement.

In another exemplary embodiment, the controller 110 may be configured to receive a user input, via the user input device 120, identifying the particular image in the three-dimensional arrangement, and to control, in response to the user input, the display 150 to present the document associated with the particular image, the document may be obtained from the storage device 130 and/or the remote storage device 140. If the controller 110 determines that the document comprises more than one page, the controller 110 may additionally be configured to control the display 150 to present the pages of the document having the same size in a diagonal arrangement.

The controller 110 may additionally be configured to receive a user input, via the user input device 120, identifying the first page of the document in the diagonal arrangement, and to control, in response to the user input, the display 150 to provide a page region and a selection region within the browsing region 160, and to present the first page in the page region and the adjacent page in the selection region.

FIGS. 2A to 2F show various diagrammatic representations of an icon based browse window 160 capable of browsing through documents, in accordance with one embodiments of the invention.

The icon based browse window 200, referred to as browse window 200 hereinafter, may for example be a graphical user interface (GUI) displayed in the display of FIG. 1. The browse window 200 may be an application window of an application such as the Windows Explorer, Apple's Finder, or any Browser application (e.g., Microsoft Internet Explorer, Mozilla Firefox, Apple's Safari, Camino, and the like). The browse windows 200 may be displayed in the display as a window having a size being smaller than the size of the viewing area of the display, or so as to have a size being equal to the size of the viewing area of the display. The browse windows 200 may be moved by the user or automatically by hardware and/or software. In each of the following embodiments shown in FIGS. 2A to 2F, the browse window 200 may provide head and bottom regions 202, 204, and a browsing region 160. In the browsing region 160, images, text, videos, and the like may be displayed. The head and bottom regions 202, 204 may comprise browse controls 206, 208 to navigate, control, modify, and the like the browse window 200. The browse controls 206, 208 may include a back button to navigate to a display of the browsing region 160 previously shown, and/or sorting order buttons (not shown) to set the sorting orders in the horizontal direction and/or the vertical direction, and/or a zoom button to modify the zoom factor of the browsing region. Other browse controls 206, 208 may be provided as required.

Figure 2B:
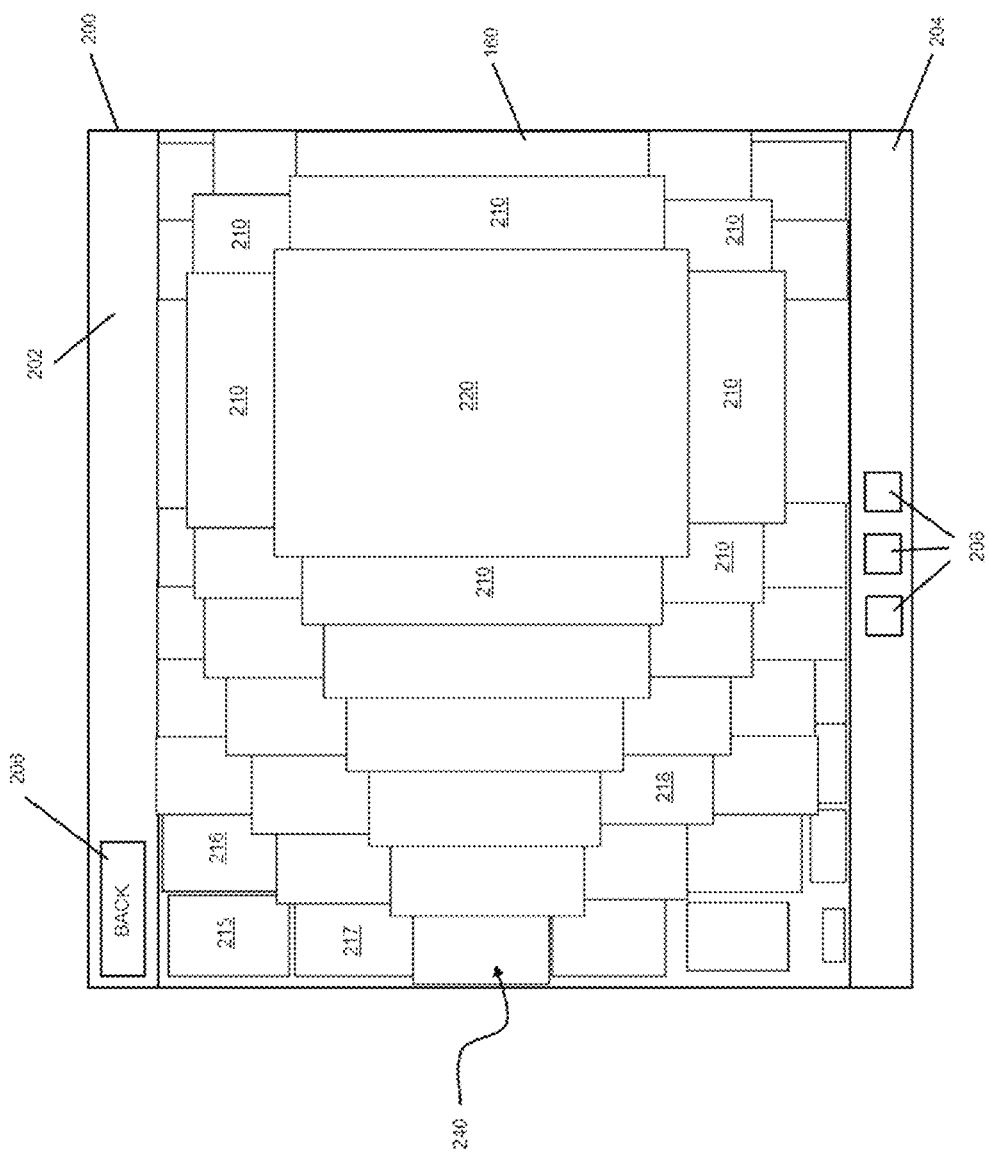

The browsing region 160 shown in FIGS. 2A to 2F will now be described in detail. In FIG. 2A, a plurality of images 210 are displayed in the browsing region 160. The plurality of images 210 may be arranged in a horizontal direction and a vertical direction, i.e. arranged in rows and columns, and thus in a two-dimensional arrangement 230. The images 210 may preferably pertain to an associated document stored in the storage device, and the images 210 may be a minimized version of the document, at least the first page thereof if the document comprises more than one page, so as to provide a preview of the associated document.

According to one exemplary embodiment, the images 210 are displayed so as to have the same size, which may be predetermined by the user or predefined in the application. The size of the images 210 may be set such that the content of the document may be read by the user. Additionally or alternatively, the images 210 may be separated from each other, i.e. so as to not overlap, or so as to overlap such that only a portion of the images 210 being overlap is exposed.

It should be appreciated that in the browsing region 160 only a part of the total number of images may be display depending on the size of the browsing region 160, the size of the images 210 and if present the size of the separation region between the images 210.

In the browsing region 160, the images 210 may be displayed in the two-dimensional arrangement 230 in a sorted manner. For example, in the horizontal direction the images 210 may be sorted in accordance with a horizontal sorting order such as, for example, the time of creation and/or last change and/or last view criterion of the associated documents to which the images pertain, and/or in the vertical direction the images 210 may be sorted in accordance with a vertical sorting order such as, for example, the relevance of the associated documents to which the images pertain with respect to a particular context and/or topic. In other examples, the sorting orders may take into account the degree of inter-relation between the associated documents. For example, according to an embodiment, the associated documents pertaining to the images are sorted in the horizontal direction on, e.g., a time base starting with the oldest document on the left hand side of the browsing region and in the vertical direction on an, e.g., alphabetic order based on, e.g., the name of the document. According to an example, documents having a name starting with an "a" are arranged on top and upper than documents having a name starting with "b".

In the browsing region 160, one particular image 220 may be identified by a user. According to one preferred embodiment, the user may touch with the finger in the touch-sensitive display on the image 220 to be identified in the two-dimensional arrangement 230, thereby generating a user input.

In FIG. 2B, the browsing region 160 of the browse windows 200, in response to the user input identifying the particular image 220, may be changed and the plurality of images may be displayed in a three-dimensional arrangement 240. In the three-dimensional arrangement 240, the images 210 may preferably be arranged in the horizontal direction and the vertical direction similar to the two-dimensional arrangement shown in FIG. 2A. In contrast to the two-dimensional arrangement 230 of FIG. 2A, the images 210 in the three-dimensional arrangement 240 may be displayed having a size which decreases from the particular image 220 being largest in both the horizontal direction and the vertical direction, and the images, for example the particular image 220, being displayed larger overlap adjacent images, for example images 210, being displayed smaller in both the horizontal direction and the vertical direction such that only a portion of the images 210 being overlapped is exposed. Preferably, the particular image 220 may be displayed having a size allowing the user to read the preview of the associated document. In other examples, the size of the images 210 being overlapped may decrease up to the predetermined size. As shown in FIG. 2B, the image 215 displayed having the predetermined size may be presented not overlapped by adjacent images 216, 217. The image 215 may be displayed with a separation region to the images 216, 217. Additionally or alternatively, in the three-dimensional arrangement 240 the portion of the images 210 being exposed, i.e. not being overlapped, may increase from the particular image 220 in both the horizontal and the vertical directions.

In accordance with one exemplary embodiment, the images 220 in the three-dimensional arrangement may be sorted according to the horizontal sorting order and/or the vertical sorting order. Particularly, in the case the horizontal sorting order is chronologically while the vertical sorting order is based on the degree of relation to context/topic, the user identifying the particular image 220 can easily see whether the particular image 220 pertains to an associated document which the user is looking for, and whether the adjacent images 210 pertain to associated documents are the documents which the user is looking for or may also be of interest to the user.

In the three-dimensional arrangement 240 shown in FIG. 2B, the user may identify another particular image 218 of the other images 210 different to the particular image 220 being displayed largest. In response to this user input identifying another particular image 218, the plurality of images 210 may be displayed in the three-dimensional arrangement 250 shown in FIG. 2C similar to the three-dimensional arrangement 240 of FIG. 2B, where the another particular image 218 may be displayed largest.

In FIG. 2D, the browsing region 160 of the browse windows 200 is shown, after a user input has been received identifying the particular image 220 in the three-dimensional arrangement 240 shown in FIG. 2B. In response to the user input, the document 221 associated with the particular image 220 of FIG. 2B may be displayed. Preferably, the document 221 may be displayed having a size allowing the user to read the content of the document 221. According to one exemplary embodiment, if the document 221-1 comprises more than one page the pages 221-1, 221-2, 221-3, 221-4 may be displayed subsequently in a diagonal arrangement 260, preferably having the same size. As shown in FIG. 2D, the first page 221-1 of the document 221 may preferably be displayed so as to overlap an adjacent page 221-2 of the document 221 such that only a portion of the adjacent page 221-2 is exposed.

Figure 2E:
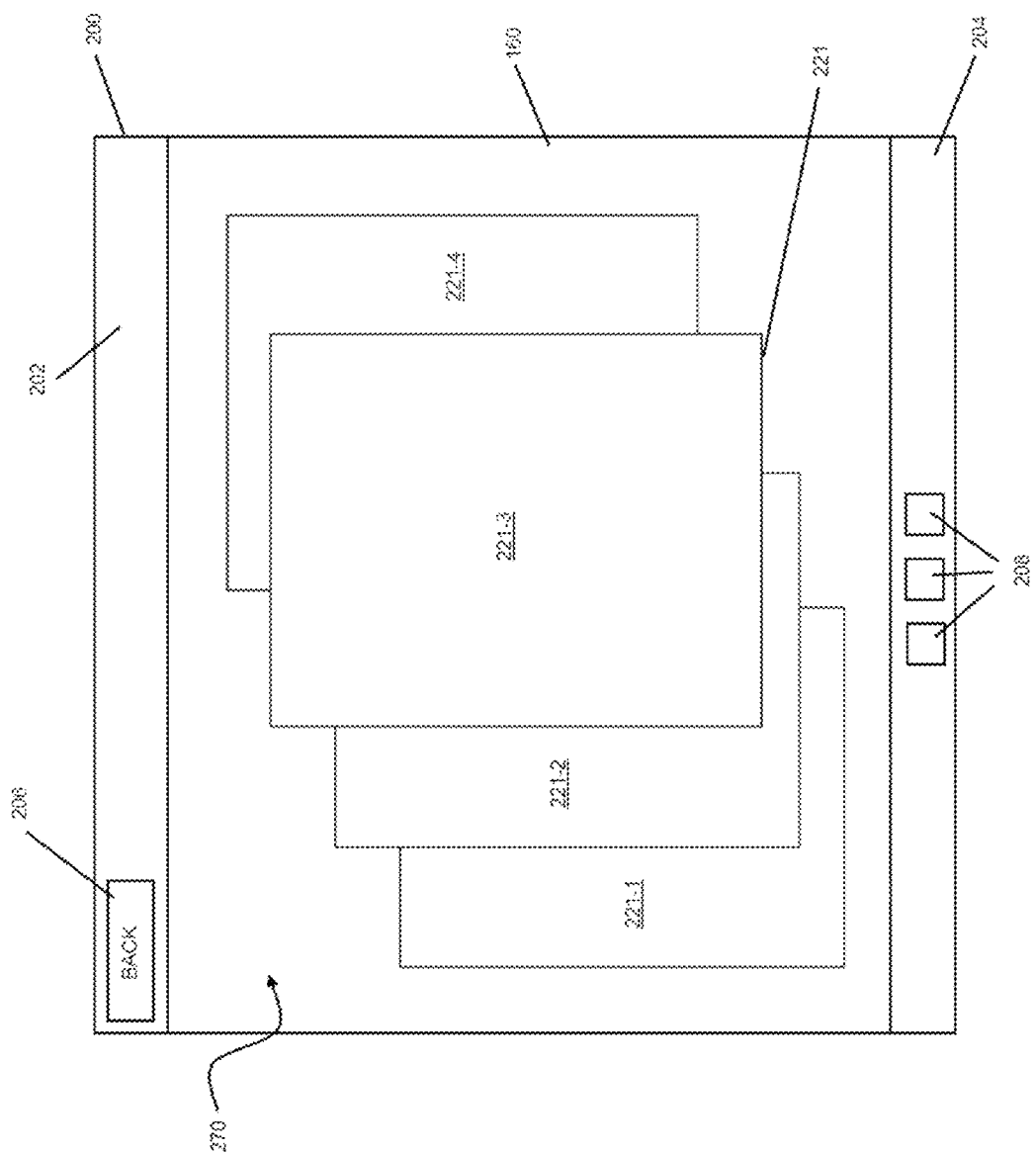
Figure 3A:
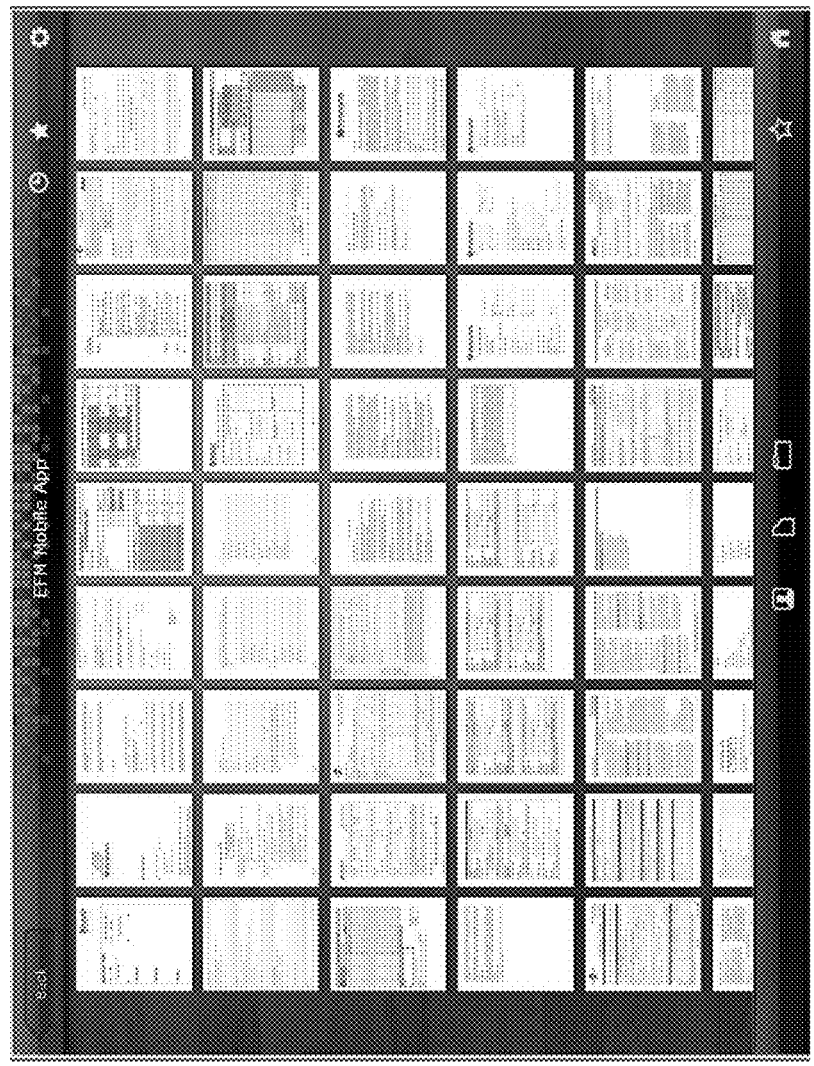
FIGS. 3A to 3F show example screen shots of a document managing and browsing application window, in accordance with one embodiment of the invention.
Figure 3B:
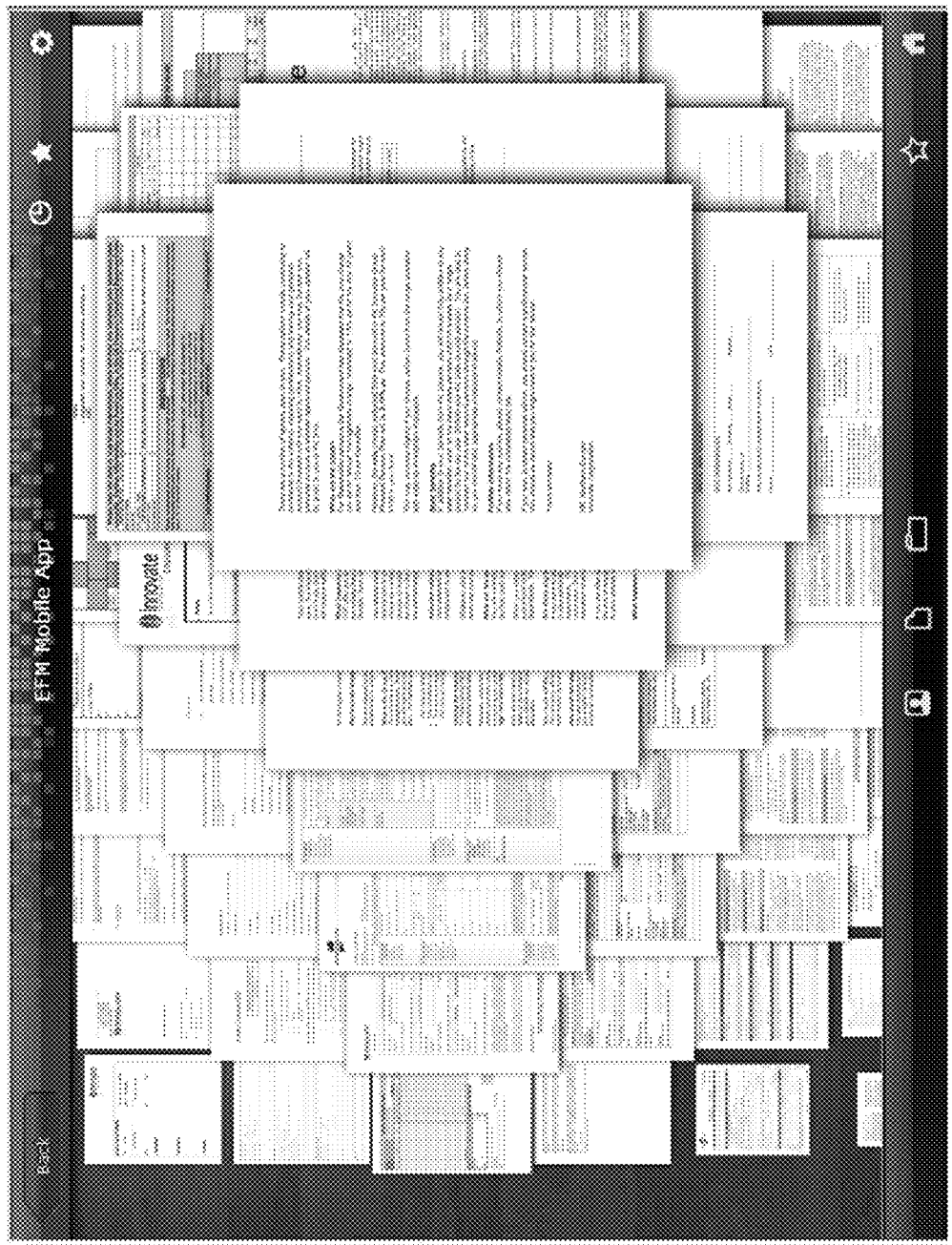
Figure 3C:
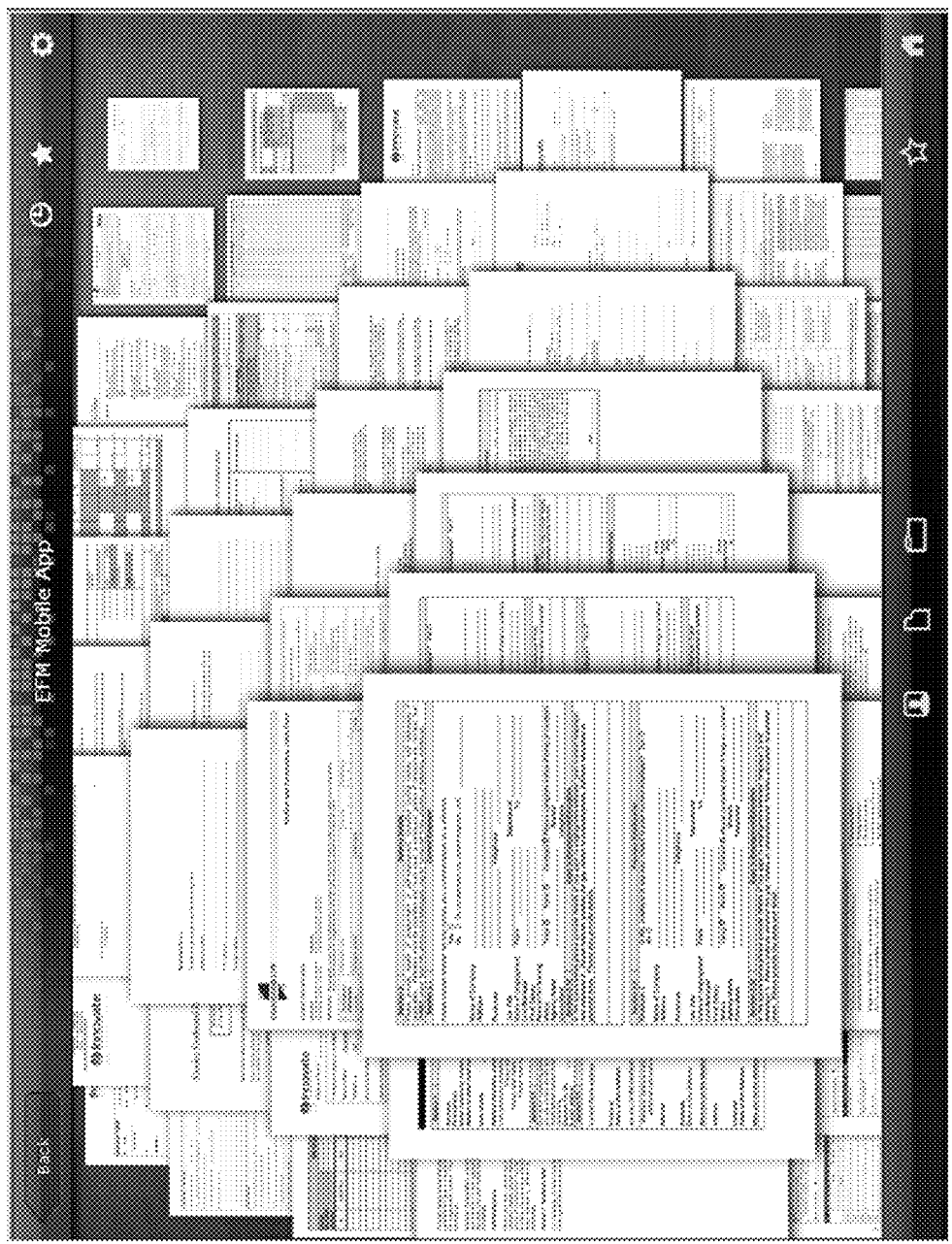
Figure 3D:
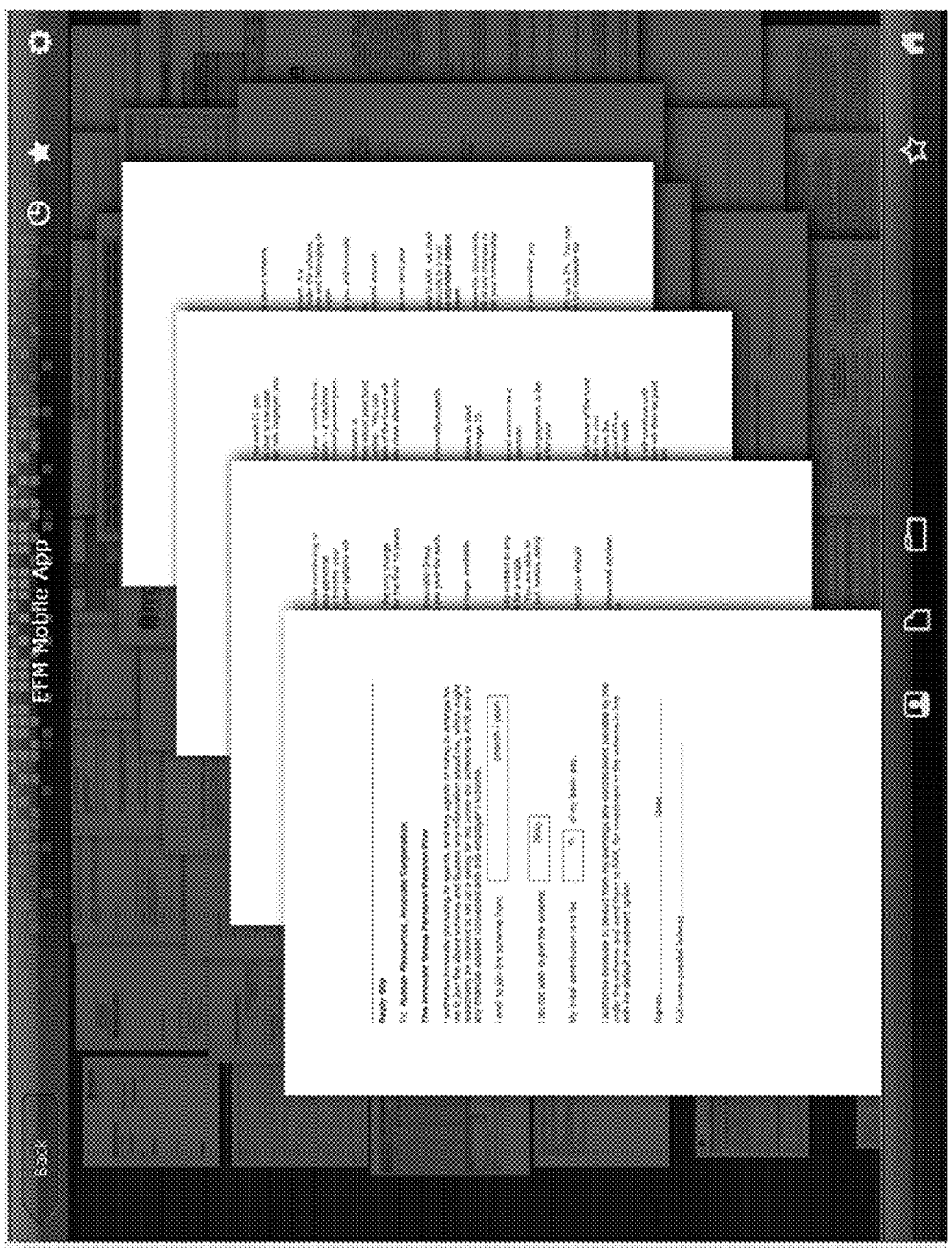
Figure 3E:
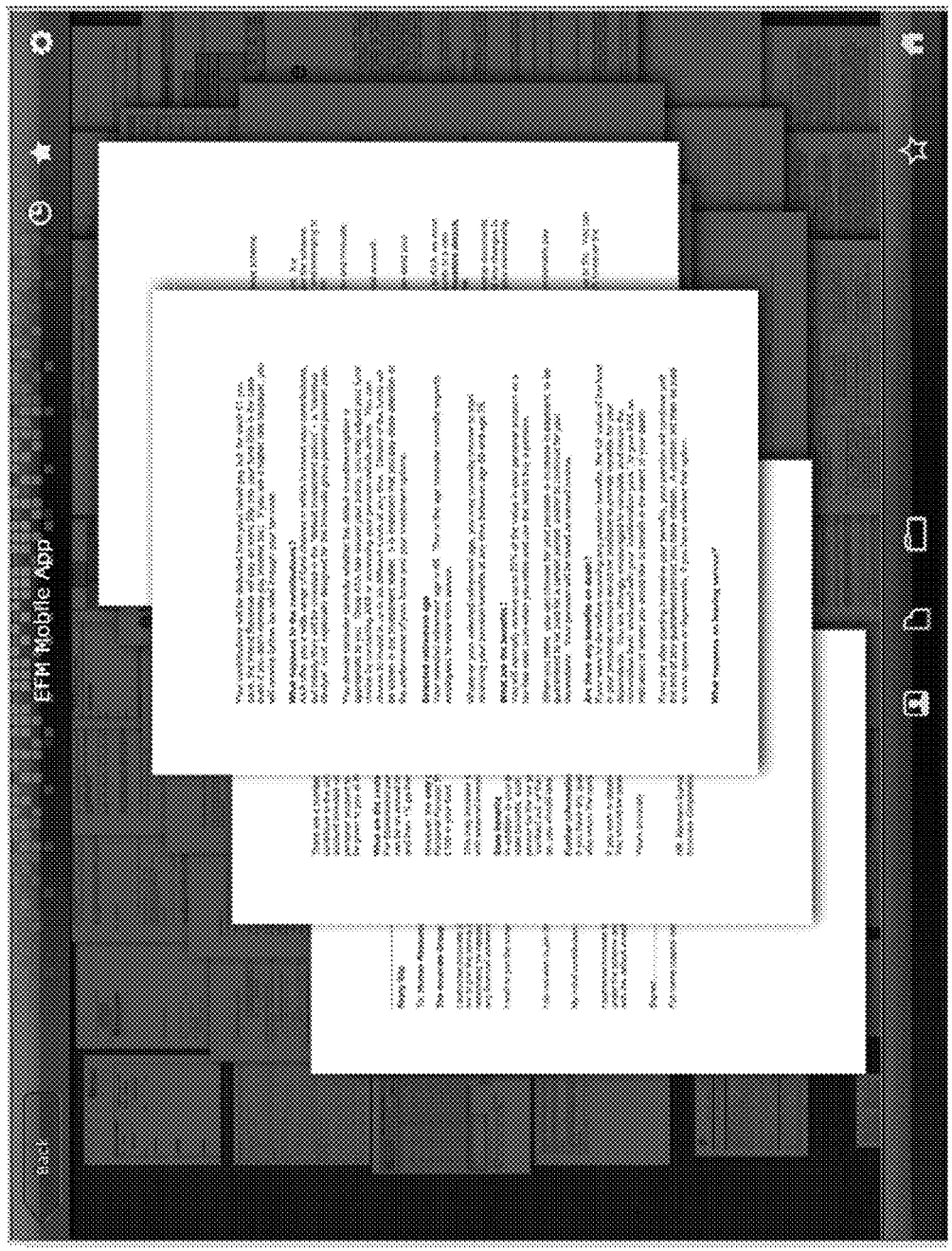
Figure 3F:
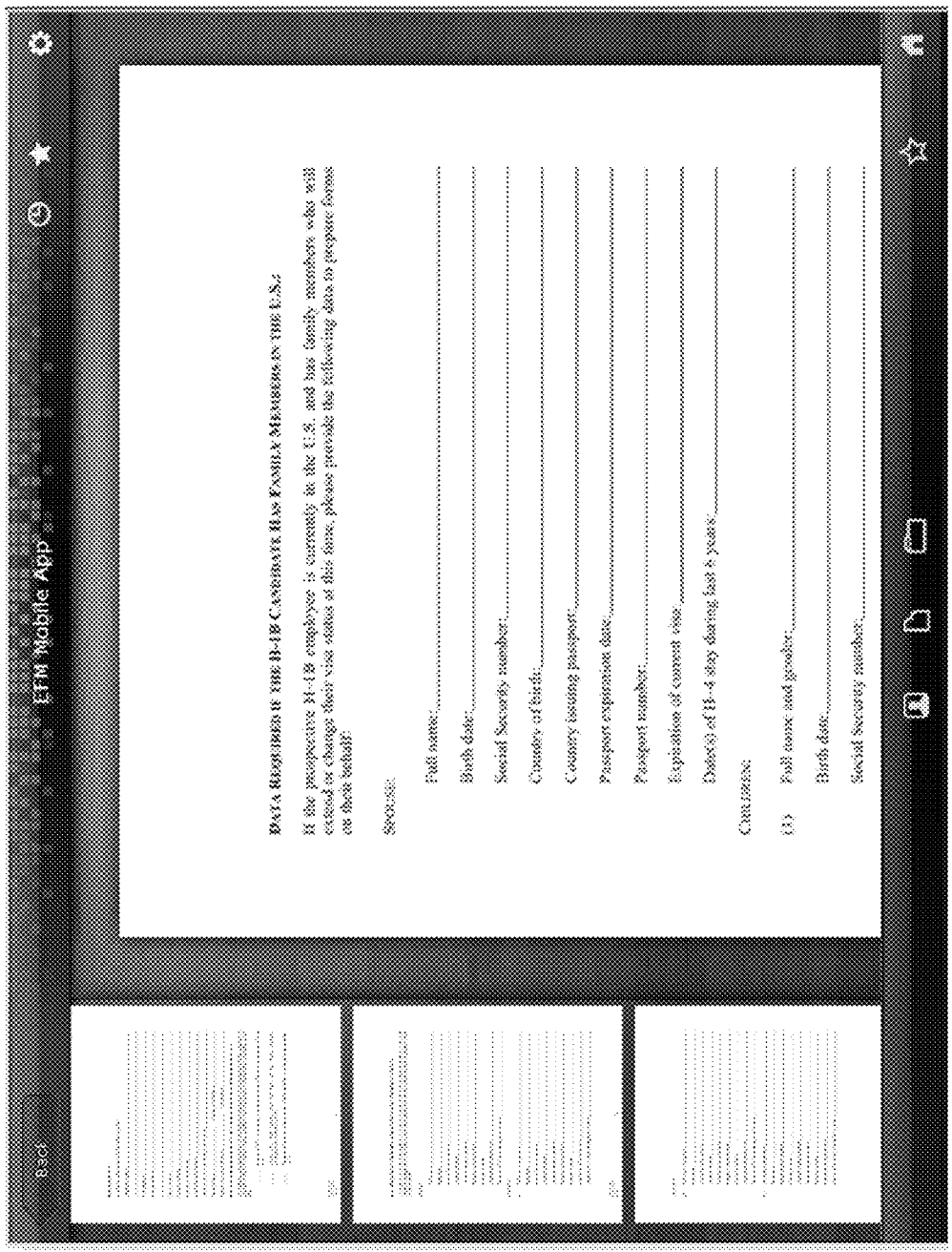

In FIG. 2E, the browsing region 160 of the browse windows 200 is shown, after a user input has been received identifying another page 221-3 different to the first page 221-1 of the diagonal arrangement 260 shown in FIG. 2D. In response to the user input, the identified page 221-3 may be displayed in the diagonal arrangement 270 similar to the diagonal arrangement 260 of FIG. 2D so as to overlap adjacent pages 221-2, 221-3, while the first page 221-1 may be overlapped by its adjacent page 221-2. The identified page 221-3 may be displayed having a size which allows the user to read the content of the identified page 221-3.

According to one exemplary embodiment, the pages 221-1 to 221-4 of document 221 in the diagonal arrangements 260, 270 of FIGS. 2D and 2E are shown to have the same size. However, as it should be appreciated the size of the pages 221-1 to 221-4 of document 221 may be different. For example, the page 221-1 of FIG. 2D may be larger than each of the pages 221-2 to 221-4, and/or the size of the pages 221-2 to 221-4 may decrease in the diagonal direction from the page 221-1.

In FIG. 2F, the browsing region 160 of the browse windows 200 is shown, after a user input has been received identifying the first page 221-1 of the document 221 in the diagonal arrangement 270 shown in FIG. 2D. In response to the user input, a page region 280 and a selection region 290 may be provided within the browsing region 160, and the first page 221-1 may be displayed in the page region 280 whereas the other pages 221-2 to 221-4 may be displayed in the selection region 290. Preferably, the first page 221-1 in the page region 280 may be displayed larger in size than the other pages 221-2 to 221-4 in the selection region 290. According to one exemplary embodiment, the page region 280 and the selection region 290 may be provided by vertically dividing the browsing region 160, where the page region 280 preferably is larger than the selection region 290. It should further be appreciated that in the page region 280 the first page 221-1 of document 221 may be displayed whereas in the selection region 290 the first page of any other document is displayed. The other documents may be sorted in a predetermined or predefined order, which may be set and/or configured using the browse controls 206, 208. In both the page region 280 and the selection region 290, the user may input scroll commands, for example, by sliding the finger over the touch-sensitive display, to scroll between the pages and/or the documents.

FIGS. 3A to 3F show by example various screen shots of a document managing and browsing application window, in accordance with one exemplary implementation of the invention. The screen shots of the exemplary implementation shown in FIGS. 3A to 3F are similar to the respective diagrams shown in FIGS. 2A to 2F.

Figure 4:
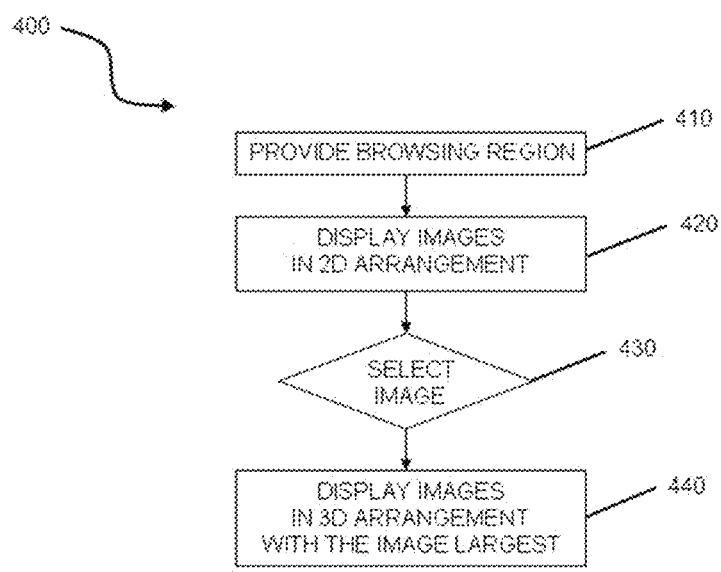
FIGS. 4 and 5 show flow charts/diagrams illustrating methods of operating browser windows, in accordance with one embodiment of the invention.

FIG. 4 depicts a flow chart/diagram illustrating a method 400 of operating browser windows, in accordance with one embodiment of the invention. The method 400 starts by providing a browsing region on the display in block 410.

The method 400 may further include block 420 where a plurality of images are displayed, within the browsing region, on the display in a two-dimensional arrangement as shown in FIG. 2A. The images may be obtained for example from a storage device before the block 420 is performed or simultaneously therewith.

The method 400 may further include block 430 where a user input identifying within the browsing region a particular image from the images displayed in the two-dimensional arrangement is received. The user input may for example be received from the touch-sensitive display when the user touches the particular image on the touch-sensitive display with the finger. Otherwise, the user input may also be received from a mouse or touchpad when the user moves the mouse/touchpad pointer onto the particular images and clicks on the mouse/touchpad button. The block 430 may also include waiting until the user input is received.

The method 400 may further include block 440 where in response to the user input received in block 430 the plurality of images are displayed on the display in a three-dimensional arrangement as shown in FIG. 2B. In block 440, the images may be arranged in the horizontal direction and the vertical direction and displayed having a size which decreases from the particular image being largest in both the horizontal direction and the vertical direction, where images being displayed larger overlap adjacent images being displayed smaller in both the horizontal direction and the vertical direction.

According to other exemplary embodiments, the images may be displayed in block 420 having a predetermined size and/or the particular image may be displayed in block 440 having a size allowing the user to read the preview of the associated document. The previous of the associated document may be obtained from the storage device in advance or simultaneously with block 440. In block 440, the size of the images may be decreased up to the predetermined size as used in block 420, and/or the portion of the images being exposed, i.e. not being overlapped, may be increased from the particular image in both the horizontal and the vertical direction.

Figure 5:
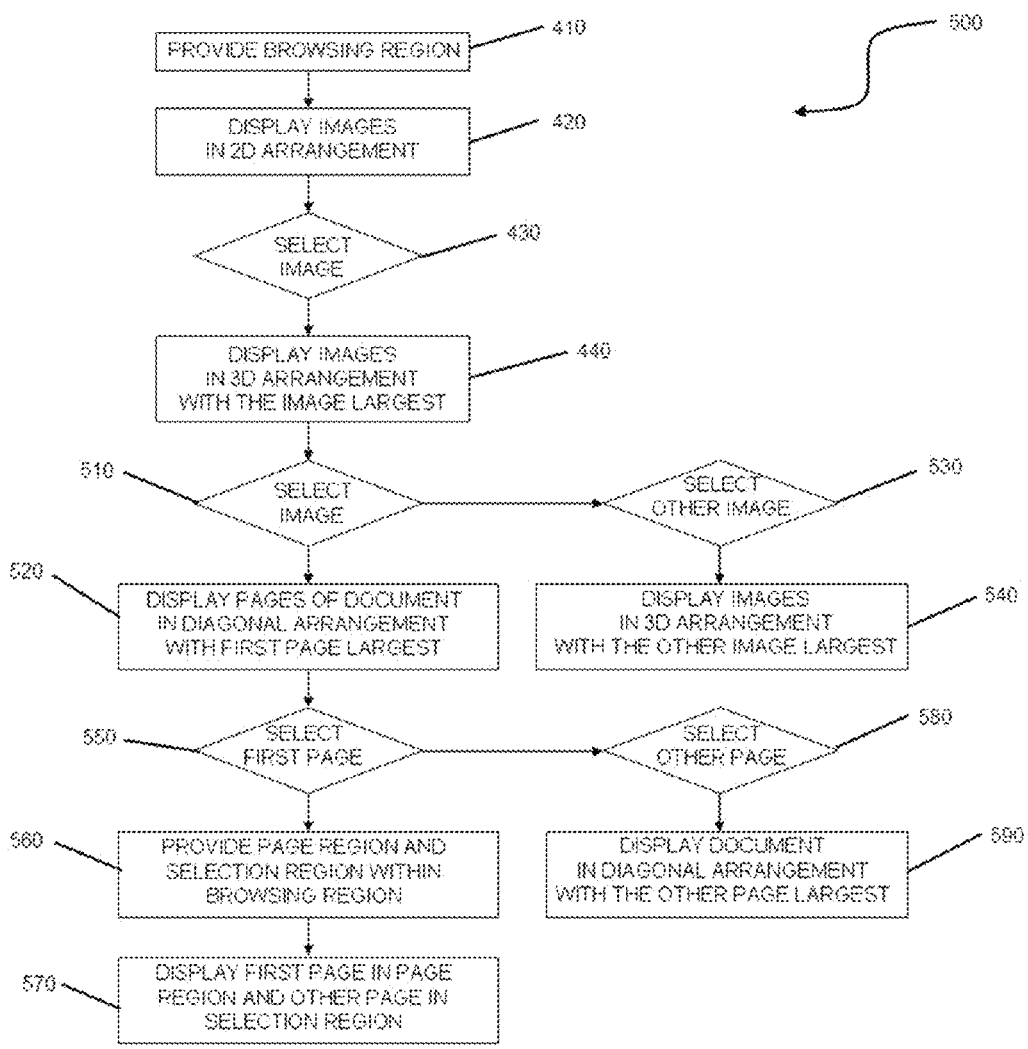

FIG. 5 depicts a flow chart/diagram illustrating a method 500 of operating browser windows, in accordance with one embodiment of the invention. The method 500 comprises the blocks 410 to 440 similar to the blocks shown in FIG. 4; the description of the blocks 410 to 440 is omitted.

According to one exemplary embodiment, the method 500 may additionally include a block 530 of receiving a user input identifying another image, i.e. not the particular displayed largest in the three-dimensional arrangement, from the other of the images displayed in the three-dimensional arrangement, and a block 540 of displaying, in response to the user input, the plurality of images on the display in the three-dimensional arrangement, where the other image is displayed largest.

According to one exemplary embodiment, the method 500 may also include a block 510 of receiving a user input identifying the particular image in the three-dimensional arrangement, and a block 520 of displaying, in response to the user input, the document associated with the particular image. The document may be obtained in advance or simultaneously from the storage device. The method may further include a block of determining whether the document comprises more than one page, where the block of displaying as described before comprises the block of displaying the pages of the document having the same size in a diagonal arrangement. Preferably, the first page of the document may be displayed in the diagonal arrangement so as to overlap an adjacent page of the document such that only a portion of the adjacent page is exposed.

According to one exemplary embodiment, the method 500 may also include a block 580 of receiving a user input identifying the adjacent page of the document in the diagonal arrangement, and a block 590 of displaying, in response to the user input, the adjacent page of the document in the diagonal arrangement so as to overlap the first page of the document such that only a portion of the first page is exposed.

According to one exemplary embodiment, the method 500 may additionally include a block 550 of receiving a user input identifying the first page of the document in the diagonal arrangement, a block 560 of providing, in response to the user input, a page region and a selection region within the browsing region, and a block 570 of displaying the first page in the page region and the adjacent page in the selection region. The first page in the page region may preferably be displayed larger in size than the adjacent page in the selection region.

The various aspects, features, embodiments or implementations of the invention described above can be used alone or in various combinations. For example, the method described in FIG. 4 and the additional blocks described above may all be used together.

Embodiments described herein can be implemented in the form of control logic in software or hardware or a combination of both. The invention can also be embodied as computer readable code on a non-transitory computer readable medium. A computer readable medium can be any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

While this invention has been described in terms of several preferred embodiments, there are alterations, permutations, and equivalents, which fall within the scope of this invention.

For example, it should be noted that the browser windows described herein are not limited to browsing through local content. The browser windows may also be used to browse through content stored at a remote location as for example at a server. If need be, the icons and/or previews of the documents can be reconfigured locally to support the graphical representation of the browser (e.g., size, skew, reflect, etc.).

It should also be noted that there are many alternative ways of implementing the methods and apparatuses of the invention.

It is therefore intended that the following appended claims be interpreted as including all such alterations, permutations, and equivalents as fall within the scope of the invention as defined by the appended claims.

What is claimed is:

1. A method for browsing documents on a display screen associated with a computing device, the method comprising:
    providing, by a controller communicatively connected to the display screen, a browsing region on the display screen of the computing device;
    displaying, within the browsing region, a plurality of images on the display screen of the computing device in a two-dimensional arrangement, wherein in the two-dimensional arrangement the plurality of images are arranged in a horizontal direction and a vertical direction, each of the plurality of images having an associated document and providing a preview of the associated document;
    receiving, by the controller, a first user input identifying within the browsing region a first particular image from the plurality of images displayed on the display screen of the computing device in the two-dimensional arrangement; and in response to the first user input, the controller transforming the plurality of images displayed on the display screen of the computing device in the two-dimensional arrangement into a three-dimensional arrangement, wherein the transforming comprises:

sizing the plurality of images for displaying on the display screen of the computing device such that the plurality of images decrease in size in the horizontal direction and in the vertical direction from the first particular image, with the first particular image being largest; and arranging the plurality of images into the three-dimensional arrangement relative to the first particular image such that the first particular image is the largest of the plurality of images on the display screen of the computing device and overlaps adjacent images in both the horizontal direction and the vertical direction and that only a portion of the adjacent images is exposed.

2. The method according to claim 1, wherein in the two-dimensional arrangement the plurality of images are arranged on the display screen so as to not overlap each other.

3. The method according to claim 1, wherein in the two-dimensional arrangement each of the plurality of images is displayed in a predetermined size and wherein in the three-dimensional arrangement the first particular image is displayed in a preview size which allows a user to read a preview of a document associated with the first particular image.

4. The method according to claim 3, wherein in the three-dimensional arrangement the adjacent images decrease in size down to the predetermined size.

5. The method according to claim 1, wherein in the three-dimensional arrangement the adjacent images are arranged in the horizontal direction, the vertical direction, or both, according to one or more sorting orders.

6. The method according to claim 1, wherein in the three-dimensional arrangement the portion of the adjacent images being exposed increases relative to a distance from the first particular image in both the horizontal and the vertical direction.

7. The method according to claim 1, further comprising:
receiving a second user input identifying a second particular image from the adjacent images displayed in the three-dimensional arrangement; and
in response to the second user input, rearranging the plurality of images on the display screen in the three-dimensional arrangement such that the second particular image is displayed largest relative to all images in the browsing region on the display screen.

8. The method according to claim 1, further comprising:
receiving a third user input identifying the first particular image in the three-dimensional arrangement; and
in response to the third user input, displaying a document associated with the first particular image in the browsing region on the display screen.

9. The method according to claim 8, wherein if the document comprises pages, the pages of the document are displayed having same size and in a diagonal arrangement.

10. The method according to claim 9, wherein in the diagonal arrangement a first page of the document is displayed so as to overlap an adjacent page of the document such that only a portion of the adjacent page is exposed.

11. The method according to claim 10, further comprising:
receiving a fourth user input identifying the adjacent page of the document in the diagonal arrangement; and
displaying, in response to the fourth user input, the adjacent page of the document in the diagonal arrangement so as to overlap on top of the first page of the document such that only a portion of the first page is exposed.

12. The method according to claim 9, further comprising:
receiving a fifth user input identifying a first page of the document in the diagonal arrangement;
providing, in response to the fifth user input, a page region and a selection region within the browsing region; and
displaying the first page in the page region and an adjacent page in the selection region, where the first page in the page region is displayed larger in size than the adjacent page in the selection region.

13. The method as recited in claim 1, where the display screen is a touch screen.

14. An electronic device, comprising:
a storage device for storing a plurality of documents;
a user input device configured to receive one or more user inputs from a user of the electronic device;
a display operable to provide a browsing region, to present, within the browsing region, a plurality of images in a two-dimensional arrangement, wherein in the two-dimensional arrangement the plurality of images are arranged in a horizontal direction and a vertical direction, each of the plurality of images having an associated document and providing a preview of the associated document; and
a controller configured to receive a first user input within the browsing region, via the user input device, identifying a first particular image from the plurality of images displayed on the display in the two-dimensional arrangement, and to control, in response to the first user input, the display to present the plurality of images in a three-dimensional arrangement, wherein the transforming comprises:
sizing the plurality of images for displaying on the display screen such that the plurality of images decrease in size in the horizontal direction and in the vertical direction from the first particular image, with the first particular image being largest; and
arranging the plurality of images into the three-dimensional arrangement relative to the first particular image such that the first particular image is the largest of the plurality of images on the display screen and overlaps adjacent images in both the horizontal direction and the vertical direction and that only a portion of the adjacent images is exposed.

15. The electronic device of claim 14, wherein in the two-dimensional arrangement the plurality of images are arranged on the display so as to not overlap each other.

16. The electronic device of claim 14, wherein in the two-dimensional arrangement each of the plurality of images is displayed in a predetermined size and wherein in the three-dimensional arrangement the first particular image is displayed in a preview size which allows a user to read a preview of a document associated with the first particular image.

17. The electronic device of claim 16, wherein in the three-dimensional arrangement the adjacent images decrease in size down to the predetermined size.

18. The electronic device of claim 14, wherein in the three-dimensional arrangement the adjacent images are arranged in the horizontal direction, the vertical direction, or both, according to one or more sorting orders.

19. The electronic device of claim 14, wherein in the three-dimensional arrangement the portion of the adjacent images being exposed increases relative to a distance from the first particular image in both the horizontal and the vertical direction.

20. The electronic device of claim 14, wherein the controller is configured to receive a second user input, via the user input device, identifying a second particular image from the adjacent images displayed in the three-dimensional arrangement, and to control, in response to the second user input, the display to present the plurality of images on the display screen in the three-dimensional arrangement such that the second particular image is displayed largest relative to all images in the browsing region on the display screen.

21. The electronic device of claim 14, wherein the controller is configured to receive a third user input, via the user input device, identifying the first particular image in the three-dimensional arrangement, and to control, in response to the third user input, the display to present a document associated with the first particular image in the browsing region on the display.

22. The electronic device of claim 21, wherein if the document comprises pages, the pages of the document are displayed having same size and in a diagonal arrangement.

23. The electronic device of claim 22, wherein in the diagonal arrangement a first page of the document is displayed so as to overlap an adjacent page of the document such that only a portion of the adjacent page is exposed.

24. The electronic device of claim 23, where the controller is configured to receive a fourth user input, via the user input device, identifying the adjacent page of the document in the diagonal arrangement, and to control, in response to the fourth user input, the display to present the adjacent page of the document in the diagonal arrangement so as to overlap on top of the first page of the document such that only a portion of the first page is exposed.

25. The electronic device of claim 22, where the controller is configured to receive a fifth user input, via the user input device, identifying a first page of the document in the diagonal arrangement, and to control, in response to the fifth user input, the display to provide a page region and a selection region within the browsing region, and to present the first page in the page region and an adjacent page in the selection region, where the first page in the page region is displayed larger in size than the adjacent page in the selection region.

26. The electronic device of claim 14, where the display is a touch screen.

27. A non-transitory computer readable storage medium having stored therein instructions, which when executed by a computing device with a display screen, cause a computing device to:
provide a browsing region on a display screen of the computing device;
display, within the browsing region, a plurality of images on the display screen of the computing device in a two-dimensional arrangement, wherein in the two-dimensional arrangement the plurality of images are arranged in a horizontal direction and a vertical direction, each of the plurality of images having an associated document and providing a preview of the associated document;
receive a first user input identifying within the browsing region a first particular image from the plurality of images displayed on the display screen of the computing device in the two-dimensional arrangement; and
in response to the first user input, transform the plurality of images displayed on the display screen of the computing device in the two-dimensional arrangement into a three-dimensional arrangement, wherein the transforming comprises:
sizing the plurality of images for displaying on the display screen of the computing device such that the plurality of images decrease in size in the horizontal direction and in the vertical direction from the first particular image, with the first particular image being largest; and
arranging the plurality of images into the three-dimensional arrangement relative to the first particular image such that the first particular image is the largest and overlaps adjacent images in both the horizontal direction and the vertical direction and that only a portion of the adjacent images is exposed.

28. The non-transitory computer readable storage medium of claim 27, wherein the first particular image in the three-dimensional arrangement is displayed on the display screen of the computing device on top of the overlapping adjacent images in both the horizontal direction and the vertical direction.

* * * * *